March 2, 1937.   W. D. CARTWRIGHT   2,072,666
ACCELERATOR BRAKE CONTROL
Filed May 20, 1935
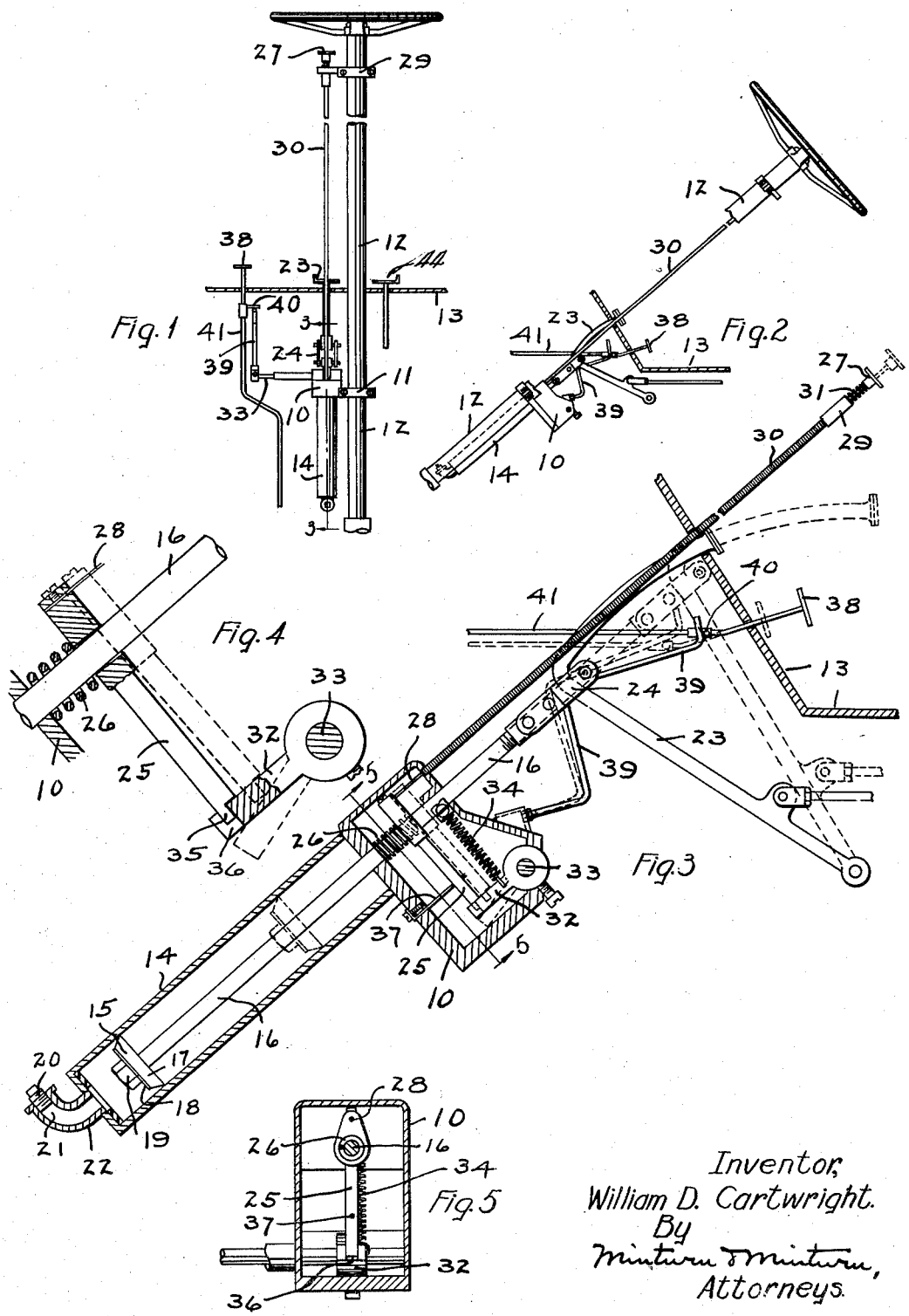
Inventor,
William D. Cartwright.
By
Minturn & Minturn,
Attorneys.

Patented Mar. 2, 1937

2,072,666

UNITED STATES PATENT OFFICE 2,072,666

ACCELERATOR BRAKE CONTROL

William D. Cartwright, Indianapolis, Ind.

Application May 20, 1935, Serial No. 22,444

4 Claims. (Cl. 192—3)

This invention relates to means for intercontrol of the throttle and the braking system in automobiles. It frequently happens, especially in hilly country that in starting an automobile, the brakes have been previously set and held by the operator's foot so that in order to operate the usual foot button controlling the throttle, the operator's foot must be removed from the brake pedal to shift to the throttle button with the result that the brake is released and the car tends to roll backward on an up-grade before the clutch is engaged and the foot throttle button depressed to permit the engine to become engaged and pick up speed sufficiently to hold the automobile and start it forwardly.

It is a primary object of my invention to provide mechanism controlled by the foot operated throttle control means which will automatically release the brakes only as the throttle button is operated to increase the speed of the engine or give it more fuel to start the load, all without requiring the operator to manipulate the brake control independently.

Other objects and advantages reside in the particular form of mechanism employed, its simplicity and adaptability for use in various types of automobiles, and more importantly, to be sure in operation without a multiplicity of working members.

Reference is made to the accompanying drawing, in which one particular form of my invention is illustrated more or less diagrammatically, Fig. 1 being a front elevation of a structure embodying my invention;

Fig. 2, a side elevation;

Fig. 3, a detail in enlarged scale in section on the line 3—3 in Fig. 1;

Fig. 4, a detail on a further enlarged scale of the brake locking means, and

Fig. 5, a transverse section on the line 5—5 in Fig. 3.

Like characters of reference indicate like parts throughout the several views in the drawing.

I form a housing 10 which has a mounting bracket 11 here shown as engaging about the steering column 12 below the floor board 13. Extending from this housing is a cylinder 14 which carries a piston 15 therein on the lower end of the rod 16 which is centrally guided to slidably pass through the housing 10 from the cylinder 14 with sufficient clearance to permit escape of air around the rod. The piston 15 is herein shown as comprising a cup leather 17 supported by a washer 18 held in compressive engagement against the end of the rod 16 by the nut 19 screw-threadedly engaging the lower end of the rod 16. The piston 15 is thus formed so as to permit the rod 16 to travel downwardly within the cylinder 14 without material compression of air under the piston since the air may travel around the piston. However on reverse travel upwardly, the edge of the leather 17 spreads out to engage the inner wall of the cylinder 14 so as to create a partial vacuum under the piston as the rod 16 may be carried upwardly. Some adjustable means is preferably provided so as to control the degree of vacuum created under the piston. In the form herein shown as one particular means, I have a plug 20 screw-threadedly engaged in the passage 21 of an ell 22 on the lower end of the cylinder 14. By loosening or tightening the plug 20, the degree of vacuum may be correspondingly varied.

The rod 16 passes on through the housing to engage through a suitable connection the brake pedal 23. In the form herein shown, I employ a shackle arrangement 24 which clamps about the pedal 23 and pivotally engages with the upper end of the rod 16 so that the rod 16 may travel in a straight line upwardly and downwardly and the shackle 24 will take up the variation in travel from that straight line as occasioned by the pedal 23 swinging around its pivot support. As will be noted the brake pedal may be depressed from the dash line position, Fig. 3, to the full line position to apply the brakes in the usual manner without any interference by the rod 16 since the formation of the piston 15 in the cylinder 14 permits the ready depression. However return travel of the pedal 23 is retarded to a slow motion by reason of the vacuum produced behind the piston 15 in the cylinder 14 as above explained, the rate of the return motion being controlled by the degree of vacuum permitted to be created. The purpose of this retarded return motion is to prevent too rapid release of the brakes as well as to prevent the pedal 23 from flying back and striking the floor board 13 with an annoying noise or hammer blow which might cause some damage.

Within the housing 10 I place a lock bar 25, through the upper end of which the rod 16 slidably passes. A spring 26 surrounds the rod 16 within the housing to bear against the lower or forward wall by one end and against the bar 25 by its other end tending normally to push the bar upwardly or rearwardly along the rod 16.

A button 27 fixed on the upper end of a rod or wire 28 in some convenient location preferably adjacent the steering wheel column 12, here shown, Fig. 1, as being supported by the column by a bracket 29 is employed to reciprocate the wire 28 through a housing 30. A spring 31 tends to return the button and its attached wire 28 to an upper or rear normal position. The lower end of the wire 28 passes into the housing 10 and is secured in fixed relation to the upper end of the bar 25 above the rod 16 so that by pushing forwardly or downwardly on the button 27, the bar 25 may be shifted downwardly or forwardly along the rod 16 to overcome in part the pressure of the spring 26, moving the bar 25 from a dash line position, Fig. 3, to a solid line position.

The lower end of the bar 25 is in the path of a latch arm 32 which is secured to a transverse shaft 33 carried by the housing 10. A spring 34 normally pulls the arm 32 upwardly against the lower end by the bar 25. The length of the arm 32 is so arranged that when the bar 25 is pushed forwardly as above indicated, the spring 34 will pull the arm 32 upwardly from the dash line position, Fig. 3, to the solid line position where the arm has dropped in back of the bar 25 so as to prevent return motion of the bar 25 under the influence of the spring 26. Preferably, although not necessarily so, the lower end of the bar 25 is stepped to provide a projecting finger 35 which rides over the top side of the arm 32 in the rear position and drops into a slot 36 in the outer end of the arm 32 when in the down or forward position as best indicated in Fig. 4.

Now since the lower end of the bar 25 is at an appreciable distance from the rod 16, release of pressure on the button 27 will not only permit the spring 31 to tend to return the button 27 but will also permit the spring 26 to exert its pressure back against the bar 25 at that portion thereof surrounding the shaft 16. In this action, the upper end of the bar 25 is tended to be pushed upwardly or rearwardly from a perpendicular position in relation to the rod 16 to an inclined position as indicated by the solid line position in Fig. 4, the engagement of the finger 35 with the arm 32 forming the pivot point. In thus rocking the bar 25, the rocking action being somewhat exaggerated in Fig. 4, the bar 25 engages the rod 16 by that movement and prevents travel of the rod 16 upwardly or rearwardly through the housing. This is readily apparent in observing Figs. 3 and 4 in that as the rod 16 would be tended to be pulled upwardly, the bar 25 being rocked into the gripping position on the rod 16, the lower end of the bar 25, the finger 35 in this instance, limits the upper or rear motion by bearing directly against the arm 32. The bar 25 is preferably guided so that its lower end will always be presented in the proper relation to the arm 32. In the form herein shown, a wire 37 is carried by the housing 10 to slidably pass through the bar 25, Fig. 3, to form the guide.

Now in order to interconnect with the foot throttle or accelerator button 38, I fix a lever 39 to the shaft 33 and carry it into the path of some operating member carried by the throttle control mechanism, the operating member in this case being a pin 40 carried on the throttle rod 41. It is to be understood, however, that this particular arrangement will have to be varied usually in different makes of cars, particularly in the formation of the lever 39 as to just where it may be carried into association with the throttle control mechanism. In any event, the operation will be the same in that as the throttle or accelerator control button 38 is depressed in the usual manner to open the carburetor valve, a slight travel will cause the lever 39 to be rocked in that direction which in turn will rock the shaft 33 to carry the arm 32 downwardly to some such position as indicated by the dash lines in Figs. 3 and 4, to overcome the pull of the spring 34 which permits the arm 32 to be rocked downwardly and release the lower end of the bar 25 to have the spring 26 straighten up the bar 25 and kick it upwardly or rearwardly and thereby permit the rod 16 to again slide freely through the bar 25 without engagement thereby.

In operating the device, supposing the automobile to be brought to a stop on an up-grade, the brake pedal 23 is depressed to the desired position which will hold the car against the pull of gravity. It is to be kept in mind that the device will work entirely satisfactorily regardless of the degree of pressure applied to the brakes which is determined by the position of the pedal 23. That is the mechanism constituting my invention will be entirely operative throughout the range of possible positions of the pedal 23 in applying the brakes. In the present illustration, Fig. 3, the brake pedal 23 is depressed to its extreme limit. Since the automobile is brought to a standstill, the accelerator button 38 is allowed to return to its normal position as indicated by the solid lines, Fig. 3. The button 27 is pushed forwardly or downwardly to carry the bar 25 to the solid line position as above indicated, sufficiently to permit the arm 32 to be pulled upwardly by the spring 34 and engage the lower end of the bar. The operator's foot may then be removed from the brake pedal 23 and thus be made available for pressing on the button 38 when the car is to be set in motion again. The other foot of the operator it is to be remembered, is, of course, employed in operating the clutch pedal 44. As above indicated, when the foot is removed from the pedal 23 after operating the button 27, the bar 25 will retain the pedal in that lowered position with the brakes applied.

Now when the car is to be started up, all that the operator has to do is to operate the clutch pedal in the usual manner and depress the button 38 whereupon the brakes are automatically released, not instantaneously, but gradually as the engine may take the load, this operation being brought about by the rocking of the lever 39 through the travel of the pin 40 thereagainst and also by the retarding action of the vacuum set up behind the piston 15 slowing up the return of the pedal 23.

While I have herein shown and described my invention in one particular form, it is obvious that structural changes may be made in applying the invention to various types of cars without departing from the spirit of the invention, and I, therefore, do not desire to be limited to that precise form beyond the limitations imposed by the following claims.

I claim:

1. In a control system including a brake pedal and a throttle control member, the combination of a slidable rod, engaged with said pedal, guide means supporting the rod, a bar slidably engaged over the rod, spring means urging the bar along the rod, an arm in the path of one side of the bar, whereby the bar under pressure of said spring means is cocked on the rod to prevent reverse movement thereof, and a member between the arm and said throttle control member actuated upon opening of the throttle to rock said arm out of engagement with said bar to permit the bar to straighten up on the rod.

2. In a control system including a brake pedal and a throttle control member, the combination of a slidable rod, engaged with said pedal, guide means supporting the rod, a bar slidably engaged over the rod, spring means urging the bar along the rod, an arm in the path of one side of the bar, means for pushing the bar against said spring means to permit engagement of the arm and the bar whereby the bar under pressure of said spring means is cocked on the rod to prevent reverse movement thereof, and a member between the arm and said throttle control member actuated upon opening of the throttle to rock said arm out of engagement with said bar to permit the bar to straighten up on the rod, said bar pushing means being yieldable to permit said straightening of the bar under the influence of said spring means.

3. In a control system including a clutch control member, a brake control member, and a throttle control member, the combination of means automatically retaining the brake member in a brake applied position a member cooperating with said retaining means normally causing the retaining means to assume an operative retaining position, and a release means interposed between the throttle control member and said retaining means permitting said retaining means to be released upon actuation of the throttle control member.

4. In a control system including a clutch shifting member, a brake applying member, and a throttle control member, the combination of means to retain said brake member in brake applied position, a member cooperating with said retaining means normally causing the retaining means to assume an operative retaining position, and throttle control member actuated means for removing said cooperating member from influence upon said retaining means.

WILLIAM D. CARTWRIGHT.